United States Patent [19]
Isobe et al.

[11] Patent Number: 6,063,825
[45] Date of Patent: May 16, 2000

[54] FLEXIBLE POLYURETHANE FOAM WITH HIGH DURABILITY

[75] Inventors: Masahiro Isobe; Kazuhiko Ohkubo; Seijiro Sakai; Usaji Takaki; Tadahito Nobori, all of Kanagawa-ken; Tsukuru Izukawa; Satoshi Yamasaki, both of Aichi-ken, all of Japan

[73] Assignee: Mitsui Chemicals, Inc., Japan

[21] Appl. No.: 09/136,307

[22] Filed: Aug. 19, 1998

[30] Foreign Application Priority Data

Aug. 19, 1997 [JP] Japan .................................. 9-222828

[51] Int. Cl.[7] .............................. C08J 9/00; C08K 3/20; C08L 75/00; C08G 18/00; C08F 8/30
[52] U.S. Cl. ........................... 521/137; 521/85; 521/108; 521/155; 521/174; 525/123; 525/455; 528/44; 528/51; 528/60; 528/65; 528/66; 528/85
[58] Field of Search ................................ 521/85, 108, 137, 521/155, 174; 528/44, 51, 66, 60, 65, 85; 525/123, 455

[56] References Cited

U.S. PATENT DOCUMENTS

| | | |
|---|---|---|
| 4,167,612 | 9/1979 | Tucker et al. . |
| 5,011,908 | 4/1991 | Hager . |
| 5,401,814 | 3/1995 | Schomaker et al. . |
| 5,777,175 | 7/1998 | Ohkubo et al. .......................... 568/619 |

FOREIGN PATENT DOCUMENTS

| | | |
|---|---|---|
| 0 763 555 | 3/1997 | European Pat. Off. . |
| 9-176272 | 7/1997 | Japan . |

*Primary Examiner*—Patrick D. Niland
*Attorney, Agent, or Firm*—Burns, Doane, Swecker & Mathis, L.L.P.

[57] ABSTRACT

A flexible polyurethane foam prepared by reacting polyisocyanate with polyol and/or polymer polyol containing dispersed polymer microparticles obtained by polymerizing an unsaturated compound, water, catalyst, surfactant and, when needed, crosslinking agent and other auxiliary agents, wherein a portion or the whole of the polyol and/or the polymer polyol is prepared in the presence of a compound having a nitrogen-phosphorus double bond as a catalyst, have excellent wet compression set, fatigue by constant-load pounding and dynamic durability.

25 Claims, No Drawings

FLEXIBLE POLYURETHANE FOAM WITH HIGH DURABILITY

BACKGROUND OF THE INVENTION

1. Field of the Invention

The present invention relates to flexible polyurethane foam and a preparation process of the foam, and more specifically relates to flexible polyurethane foam which has improved durability and is frequently used for vehicle interiors, furniture cushions, bedding and miscellaneous goods, and a preparation process of the foam.

2. Related Art of the Invention

Flexible polyurethane foam (hereinafter referred to also simply as flexible foam or foam) is widely used for vehicles, furniture, bedding and miscellaneous goods due to the cushioning properties of the foam. Flexible foam is prepared by reacting aromatic polyisocyanate with polyol and/or polymer polyol containing dispersed polymer particles obtained by radical polymerization of acrylonitrile and/or styrene in the polyol, in the presence of water as a blowing agent, silicone based surfactant, catalyst such as amine and a tin compound, and, when needed, crosslinking agent, flame retardant and colorant. Water, the blowing agent, reacts with aromatic polyisocyanate and releases carbon dioxide which acts as blowing gas. At the same time, aromatic polyurea is formed and built in the foam structure.

In recent years, use of a conventional blowing agent (Freon), CFC-11 has been forbidden on the basis of Montreal treaty in order to protect global environment. Water was conventionally a blowing additive when Freon was used. However, as a result of the treaty, water has been used as an alternative blowing agent so as to exhibit similar blowing effect. Thus, amount of water used in the formulation has been increased. Furthermore, cost reduction has been strongly demanded in recent years, lower density foam is desired for weight reduction. In application to vehicles, reduction of foam density is also required for weight reduction in order to cope with fuel economy. As a countermeasure to these demands for density reduction, the amount of water used for the blowing agent is liable to further increase. Increase in water leads to greater amount of generated carbon dioxide gas and is thus effective for density reduction of the flexible foam. On the other hand, resulting aromatic polyurea impairs compression set and dynamic durability in vibration condition under load of flexible foam. Further, lowered foam density itself results in the impairment of such strain property and endurance characteristic.

Such damage of shape stability and durability of flexible foam leads to various ill conditions. For example, thickness of bedding cushions decreases in the course of use, or vehicle cushions vary in thickness or hardness with extended use. Particularly in vehicle cushions, long time vehicle driving decreases designed thickness and hardness of cushions, lowers prescribed position of the driver, narrows field of view of the driver, impairs safety and damages riding comfort. These problems are originated from the durability of flexible foam and can be evaluated by measuring variation of thickness or hardness in a fatigue by constant-load pounding, and can also be evaluated by measuring variation of thickness or hardness of flexible foam before and after the dynamic durability in vibration condition under load.

Various countermeasures against these problems have been investigated by using dry compression set and wet compression set which are indices of shape stability and durability. The value of compression set can be regarded as the index on evaluation of shape stability of flexible foam. However, in view of practical use condition of flexible foam, the problem is durability in a vibration condition under load. Thus, compression set or other static test alone is unsatisfactory to the index of durability.

Formulation of an increased amount of a crosslinking agent is a practical method for improving the compression set property of flexible foam. However, such a method has limited the range of improvement because this method markedly reduces mechanical properties such as elongation and tear resistant strength of flexible foam. No example for evaluating the dynamic durability in vibration condition under load has also been found.

On the other hand, potassium hydroxide has been mainly used for the catalyst of preparing polyether polyol. Investigations for improving compression set of flexible foam by exchanging the catalyst have also been carried out.

For example, Japanese Laid-Open Patent HEI 02-115211 has described that impairment of compression set can be reduced by using polyether polyol prepared in the presence of a metal cyanide complex as a catalyst. However, no description has been found on the durability improvement of flexible foam. Japanese Laid-Open Patent HEI 03-068620 has also improved wet compression set by means of a similar technique.

However, no description has been found on the improvement of durability. Further, Japanese Laid-Open Patent HEI 03-014812 is the same as above.

Japanese Laid-Open Patent HEI 07-278289 has described that wet compression set can be improved by using polyether polyol prepared in the presence of cesium hydroxide and/or rubidium hydroxide as the catalyst. However, no description has been found on the dynamic durability in vibration condition under load. Moreover, diethyl zinc, iron chloride, metallic porphyrin and metal cyanide complex are very expensive catalysts and raise production cost of polyether polyol. In addition, it is a great problem that, when the resulting polyether polyol is used for the preparation of flexible foam, blowing stability of foam is reduced to render the fresh foam structure unstable and thus processing ability is impaired. Cesium hydroxide and rubidium hydroxide are also expensive catalysts. Although catalytic activity is higher than potassium hydroxide, these two catalysts are still unsatisfactory to remarkably reduce manufacturing time of polyether polyol and thus are difficult to reduce production cost and greatly improve properties of flexible foam.

Consequently, it is now desired to greatly improve durability of flexible foam and to complete a low cost flexible foam having no problem on the processing ability and a preparation process of such flexible foam.

SUMMARY OF THE INVENTION

One object of the invention is to provide a flexible foam having improved durability, particularly having greatly reduced variation of thickness and hardness loss in the dynamic durability in vibration condition under load and rendering compression set minimum, and a preparation process of the flexible foam.

Another object of the invention is to eliminate the problem such as difficulty in the preparation process of the flexible foam, and to reduce the production cost of the flexible foam.

As a result of various investigations, the present inventors have found that a flexible foam having excellent durability can be prepared by using polyol prepared in the presence of a compound having a nitrogen-phosphorus double bond as a catalyst. Thus the present invention has been completed.

That is, one aspect of the invention is a flexible polyurethane foam prepared by reacting polyisocyanate with polyol and/or polymer polyol containing dispersed polymer microparticles obtained by polymerizing an unsaturated compound, water, catalyst, surfactant and, when needed, crosslinking agent and other auxiliary agents, comprising that a portion or the whole of the polyol and/or the polymer polyol is prepared in the presence of a compound having a nitrogen-phosphorus double bond as a catalyst, and a preparation process thereof.

Further, the present invention relates to a flexible polyurethane foam comprising preparing 20 wt % or more polyol in the presence of a compound having a nitrogen-phosphorus double bond as a catalyst, and a preparation process of the flexible polyurethane foam; and a flexible polyurethane foam and a preparation process thereof where in the compound having the nitrogen-phosphorus double bond is a phosphazenium compound.

Furthermore, the present invention relates to a flexible polyurethane foam and a preparation process of the foam comprising using a polyol which is obtained by polymerizing alkylene oxide in the presence of an active hydrogen compound having a functionality of 2 to 6, preferably 3 to 4, and a compound having a nitrogen-phosphorus double bond, has a hydroxyl value of 10 to 40 mg KOH/g, and has an ethylene oxide ratio of 5 to 30 wt % in alkylene oxide; and a flexible polyurethane foam and a preparation process thereof wherein the polyol comprises 15 mol % or less monool and has 96% or more selectivity of head-to-tail bonding; and a flexible polyurethane foam and a preparation process thereof wherein the polymer of the unsaturated compound in the polymer polyol is 2 to 50 wt %.

Further, the present invention relates to a flexible polyurethane foam and a preparation process of the foam wherein the polyisocyanate is tolylene diisocyanate or a mixture of tolylene diisocyanate with polymethylenepolyphenyl polyisocyanate in an weight ratio of 98:2 to 50:50.

That is, the present invention provides (1) to (34) shown below.

(1) A flexible polyurethane foam prepared from polyol and/or polymer polyol having a dispersed polymer microparticle obtained by polymerizing an unsaturated compound in the polyol, water, catalyst, surfactant, miscellaneous additives and polyisocyanate, comprising polyol ingredient prepared in the presence of a compound having a nitrogen-phosphorus double bond as a catalyst.

(2) A flexible polyurethane foam according to (1) wherein the polymer polyol is prepared by radical polymerization of an unsaturated compound in the polyol and the resulting polymer microparticle is dispersed in the polyol.

(3) A flexible polyurethane foam according to (1) or (2) wherein the polyol has a monool content of 15 mol % or less and a head-to-tail bonding selectivity of 96% or more.

(4) A flexible polyurethane foam comprising additionally using an active hydrogen compound having a hydroxyl value of 200 to 2000 mg KOH/g as a crosslinking agent for a flexible polyurethane foam according to one of (1) to (3).

(5) A flexible polyurethane foam according to one of (1) to (4) wherein 20 wt % or more in the polyol ingredient is prepared in the presence of a compound having a nitrogen-phosphorus double bond as a catalyst.

(6) A flexible polyurethane foam according to one of (1) to (4) wherein 40 wt % or more in the polyol ingredient is prepared in the presence of a compound having a nitrogen-phosphorus double bond as a catalyst.

(7) A flexible polyurethane foam according to one of (1) to (6) wherein the polyol is prepared by polymerization of alkylene oxide on an active hydrogen compound having a functionality of 2 to 6 in the presence of a compound having a nitrogen-phosphorus double bond, has a hydroxyl value of 10 to 40 mg KOH/g, and has an ethylene oxide proportion 5 to 30 wt % in alkylene oxide.

(8) A flexible polyurethane foam according to one of (1) to (6) wherein the polyol is prepared by polymerization of alkylene oxide on an active hydrogen compound having a functionality of 3 to 4 in the presence of a compound having a nitrogen-phosphorus double bond, has a hydroxyl value of 15 to 35 mg KOH/g, and has an ethylene oxide proportion of 10 to 20 wt % in alkylene oxide.

(9) A flexible polyurethane foam according to one of (1) to (8) wherein the polymer microparticles obtained by polymerization of an unsaturated compound have a proportion of 2 to 50 wt % in the polymer dispersed polyol.

(10) A flexible polyurethane foam according to one of (1) to (8) wherein the polymer microparticles obtained by polymerization of an unsaturated compound have a proportion of 10 to 40 wt % in the polymer polyol.

(11) A flexible polyurethane foam according to one of (1) to (10) wherein the compound having a nitrogen-phosphorus double bond is a phosphazenium compound represented by the formula (1) or the formula (2)

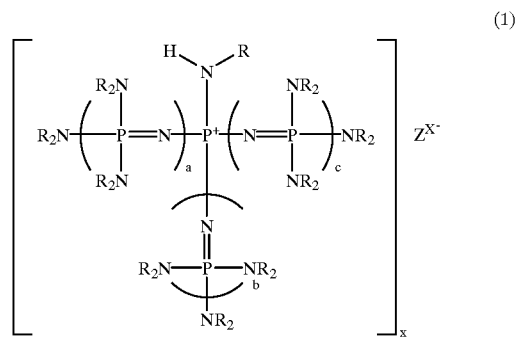

wherein a, b and c are individually a positive integer of 3 or less 0 and are not all 0 at the same time, R's are the same or different hydrocarbons having 1 to 10 carbon atoms, and two R's located on each common nitrogen atom may be coupled together to form a ring structure, X indicates the number of phosphazenium cations, $Z^{x-}$ is an anion of a X-valent active hydrogen compound.

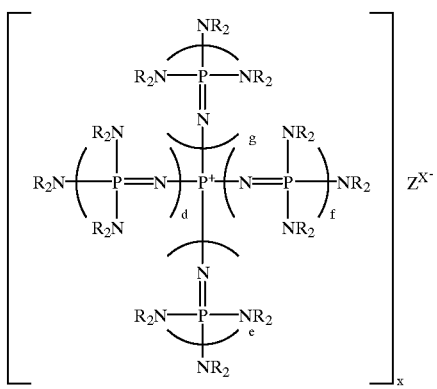

(2)

wherein d, e, f and g are individually a positive integer of 3 or less or 0 and are not all 0 at the same time, R's are the same or different hydrocarbons having 1 to 10 carbon atoms, and two R's located on each common nitrogen atom may be coupled together to form a ring structure, X indicates the number of phosphazenium cations, $Z^{x-}$ is an anion of a X-valent active hydrogen compound.

(12) A flexible polyurethane foam according to one of (1) to (11) wherein polyisocyanate is tolylene diisocyanate.

(13) A flexible polyurethane foam according to one of (1) to (11) wherein polyisocyanate is a 98:2 to 50:50 weight ratio mixture of tolylene diisocyanate and polymethylenepolyphenyl polyisocyanate represented by the formula (3):

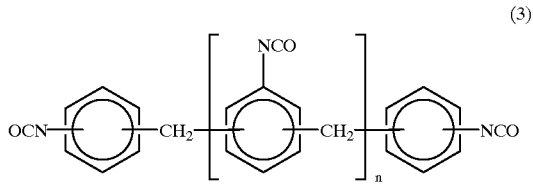

(3)

wherein n is 0 or an integer of 1 or more.

(14) A flexible polyurethane foam according to one of (1) to (11) wherein polyisocyanate is a mixture or a urethane modified derivative of the mixture comprised of 30 to 95 wt % of diphenylmethane diisocyanate having an isomer ratio of 1:99 to 50:50 in 2,4'-diphenylmethane diisocyanate to 4,4'-diphenylmethane diisocyanate and 70 to 5 wt % of polymethylenepolyphenyl polyisocyanate having 1 or more n in the formula (3):

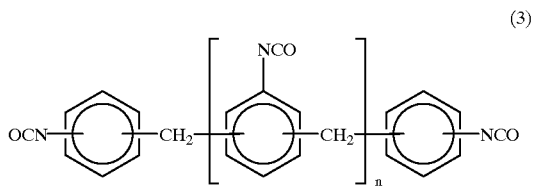

(3)

wherein n is 0 or an integer of 1 or more.

(15) A flexible polyurethane foam according to one of (1) to (11) wherein polyisocyanate is a mixture of polyisocyanate according to (14) and tolylene diisocyanate, and tolylene diisocyanate occupies 1 to 70 wt % of said mixture.

(16) A preparation process of a flexible polyurethane foam prepared by reacting polyisocyanate with polyol and/or polymer polyol having a dispersed polymer microparticle obtained by polymerizing an unsaturated compound in the polyol, water, catalyst, surfactant, miscellaneous additives and polyisocyanate, comprising a polyol ingredient prepared in the presence of a compound having a nitrogen-phosphorus double bond as a catalyst.

(17) A preparation process of a flexible polyurethane foam according to (16) wherein the polymer polyol is prepared by radical polymerization of an unsaturated compound in the polyol and the resulting polymer microparticle is dispersed in the polyol.

(18) A preparation process of a flexible polyurethane foam according to (16) or (17) wherein the polyol has a monool content of 15 mol % or less and a head-to-tail bonding selectivity of 96% or more.

(19) A preparation process of a flexible polyurethane foam comprising additionally using an active hydrogen compound having a hydroxyl value of 200 to 2000 mg KOH/g as a crosslinking agent for a flexible polyurethane foam according to one of (16) to (18).

(20) A preparation process of a flexible polyurethane foam according to one of (16) to (19) wherein 20 wt % or more in the polyol ingredient is prepared in the presence of a compound having a nitrogen-phosphorus double bond as a catalyst.

(21) A preparation process of a flexible polyurethane foam according to one of (16) to (19) wherein 40 wt % or more in the polyol ingredient is prepared in the presence of a compound having a nitrogen-phosphorus double bond as a catalyst.

(22) A preparation process of a flexible polyurethane foam according to one of (16) to (21) wherein the polyol is prepared by polymerization of alkylene oxide on an active hydrogen compound having a functionality of 2 to 6 in the presence of a compound having a nitrogen-phosphorus double bond, has a hydroxyl value of 10 to 40 mg KOH/g, and has an ethylene oxide proportion of 5 to 30 wt % in alkylene oxide.

(23) A preparation process of a flexible polyurethane foam according to one of (16) to (21) wherein the polyol is prepared by polymerization of alkylene oxide on an active hydrogen compound having a functionality of 3 to 4 in the presence of a compound having a nitrogen-phosphorus double bond, has a hydroxyl value of 15 to 35 mg KOH/g, and has an ethylene oxide proportion of 10 to 20 wt % in alkylene oxide.

(24) A preparation process of a flexible polyurethane foam according to one of (16) to (23) wherein the polymer microparticles obtained by polymerization of an unsaturated compound have a proportion of 2 to 50 wt % in the polymer dispersed polyol.

(25) A preparation process of a flexible polyurethane foam according to one of (16) to (23) wherein the polymer microparticles obtained by polymerization of an unsaturated compound have a proportion of 10 to 40 wt % in the polymer dispersed polyol.

(26) A preparation process of a flexible polyurethane foam according to one of (16) to (25) wherein the compound having a nitrogen-phosphorus double bond is a phosphazenium compound represented by the formula (1) or the formula (2):

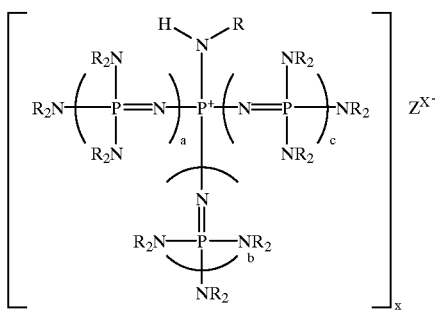

(1)

wherein a, b and c are individually a positive integer of 3 or less or 0 and are not all 0 at the same time, R's are the same or different hydrocarbons having 1 to 10 carbon atoms, and two R's located on each common nitrogen atom may be coupled together to form a ring structure, X indicates the number of phosphazenium cations, $Z^{x-}$ is an anion of a X-valent active hydrogen compound.

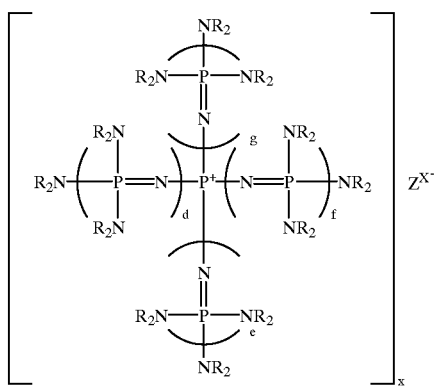

(2)

wherein d, e, f and g are individually a positive integer of 3 or less 0 and are not all 0 at the same time, R's are the same or different hydrocarbons having 1 to 10 carbon atoms, and two R's located on each common nitrogen atom may be coupled together to form a ring structure, X indicates the number of phosphazenium cations, $Z^{x-}$ is an anion of a X-valent active hydrogen compound.

(27) A preparation process of a flexible polyurethane foam according to one of (16) to (26) wherein polyisocyanate is tolylene diisocyanate.

(28) A preparation process of a flexible polyurethane foam according to one of (16) to (26) wherein polyisocyanate is a 98:2 to 50:50 weight ratio mixture of tolylene diisocyanate and polymethylene polyphenyl polyisocyanate represented by the formula (3):

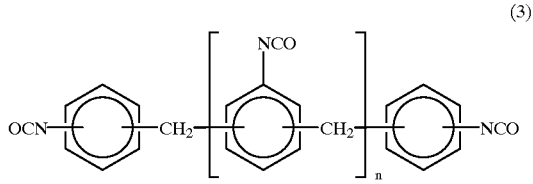

(3)

wherein n is 0 or an integer of 1 or more.

(29) A preparation process of a flexible polyurethane foam according to one of (16) to (26) wherein polyisocyanate is a mixture or a urethane modified derivative of the mixture comprised of 30 to 95 wt % of diphenylmethane diisocyanate having an isomer ratio of 1:99 to 50:50 in 2,4'-diphenylmethane diisocyanate to 4,4'-diphenylmethane diisocyanate and 70 to 5 wt % of polymethylenepolyphenyl polyisocyanate having 1 or more n in the formula (3):

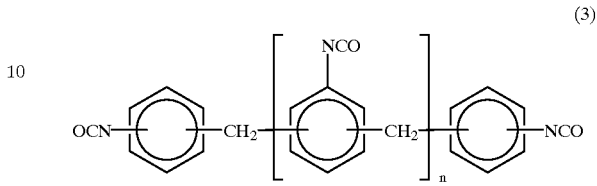

(3)

wherein n is 0 or an integer of 1 or more.

(30) A preparation process of a flexible polyurethane foam according to one of (1) to (26) wherein polyisocyanate is a mixture of polyisocyanate according to (29), and tolylene diisocyanate and tolylene diisocyanate occupies 1 to 70 wt % of said mixture.

(31) A flexible polyurethane foam having wet compression set of 11.5% or less, hardness loss in dynamic durability of 20% or less and height loss in dynamic durability of 2.5% or less.

(32) A flexible polyurethane foam according to (31) wherein the flexible polyurethane foam is prepared from polyol and/or polymer polyol having a dispersed polymer microparticle obtained by polymerizing an unsaturated compound in the polyol, water, catalyst, surfactant, miscellaneous additives and polyisocyanate, and the polyol ingredient is prepared in the presence of a compound having a nitrogen-phosphorus double bond as a catalyst.

(33) A flexible polyurethane foam according to (32) wherein the polymer polyol is prepared by radical polmerization of unsaturated compound in the polyol and the resulting polymer microparticle is dispersed in the polyol.

(34) A flexible polyurethane foam according claim (32) or (33) wherein the compound having a nitrogen-phosphorus double bond is phosphazenium compound represented by the above formula (1) or (2).

A flexible polyurethane foam which is excellent in fatigue by constant-load pounding, dynamic durability, vibration durability, and wet compression set can be prepared by using polyol obtained in the presence of a catalyst having a nitrogen-phosphorus double bond.

DETAILED DESCRIPTION OF THE INVENTION

The invention will hereinafter be illustrated further in detail.

In the invention, the term polyol is referred to as polyoxyalkylene polyether polyol obtained by ring-opening polymerization of propylene oxide, ethylene oxide or other alkylene oxides on an active hydrogen compound, for example, water, dihydric alcohol such as ethylene glycol and propylene glycol, trihydric alcohol such as glycerol and trimethylolpropane, tetrahydric alcohol such as pentaerythritol and diglycerol, and saccharides such as sugar, sorbitol and methylglucoside. These compounds are used singly or as a mixture for the initiator.

Other conventionally known polyols such as polyester polyol can also be used in an amount of less than 80 wt % for the total polyol, when the flexible polyurethane foam of the present invention is prepared by using a mixture of polyol and/or the polymer polyol of the present invention and a conventional polyol.

Further, in the invention, the term polymer polyol is a dispersion obtained by dispersion polymerization of unsaturated compound such as acrylonitrile or styrene in the presence of a radical initiator such as azobisisobutyronitrile in the polyol. The resulting vinyl polymer particles (hereinafter referred to simply as polymer microparticles) are portionally grafted.

In the polymer polyol used in the invention, the proportion of vinyl polymer microparticles in polyoxyalkylene polyol is usually 2 to 50 wt %.

Other conventionally known polymer polyols can be contained without any trouble in an amount of less than 80 wt % of the total polyol, when the flexible polyurethane foam of the present invention is prepared by using a mixture of polyol and/or the polymer dispersed polyol of the present invention with a conventional polyol.

These polyols and polymer polyols can be individually used singly, or as a mixture, or individually as a mixture.

Conventionally, in polyurethane foam is prepared, in case of polyalkylenepolyol is generally used as a polyol ingredient, polyol is commonly prepared by polymerization of alkylene oxide in the presence of alkali metal hydroxide as a catalyst. However, when polyol is prepared by using propylene oxide which is most widely used alkylene oxide, KOH catalyst generates by-product which is so-called monool. The by-product has an unsaturated group at the end of a molecular chain and decreases an average functionality of resulting polyol because the unsaturated group does not react with polyisocyanate. Besides, the unsaturated group prevents chain growth of resulting polyol, increases content of low molecular weight polyol and leads to form polyoxyalkylene polyol having an extremely broad distribution of a molecular weight. When polyoxyalkylene polyol having such a high by-product content is used for the preparation of polyurethane foam, the resulting polyurethane foam causes impairments in the properties of polyurethane foam, such as, increase in hysteresis, decrease in hardness, lowering of elongation, and reduction of curing ability.

On the other hand, polyol and/or polymer polyol of the invention is prepared in the presence of a compound having a nitrogen-phosphorus double bond as a catalyst, and polyurethane foam prepared from such polyol has excellent properties.

The polyol prepared in the presence of a compound having a nitrogen-phosphorus double bond as a catalyst is preferably used for the preparation of flexible polyurethane foam in the invention, and the amount of such polyol is 20 wt % or more, preferably 30 wt % or more, more preferably 40 wt % or more for the total polyol including polymer polyol. It is no matter that the amount of less than 80 wt % of the total polyol which is conventionally known polyols and/or polymer polyols.

No particular restriction is imposed upon the compound having a nitrogen-phosphorus double bond, and being capable of applying to the catalyst. Phosphazenium compound is preferred.

That is, polyol which can be preferably used in the present invention can be obtained by polymerization of a alkylene oxide in the presence of a phosphazenium compound represented by the formula (1) or the formula (2).

The phosphazenium compound which can be used for preparing polyol is a salt of a phosphazenium cation having the structure represented by the formula (1) or the formula (2), with an anion of the active hydrogen compound.

The phosphazenium cation is represented by the limiting structure having the electric charge localized on the central phosphorus atom. However, other numerous limiting structures can be shown and, in a practical condition, the electric charge is depolarized on the whole portion.

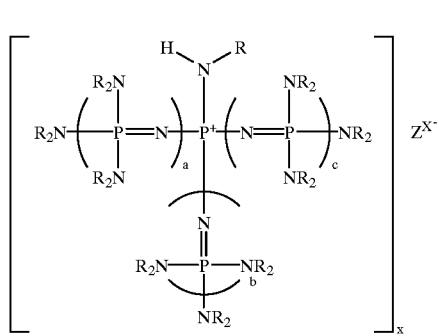

wherein a, b and c are individually a positive integer of 3 or less or 0 and are not all 0 at the same time, R's are the same or different hydrocarbons having 1 to 10 carbon atoms, and two R's located on each common nitrogen atom may be coupled together to form a ring structure, X indicates the number of phosphazenium cations, $Z^{x-}$ is an anion of a X-valent active hydrogen compound.

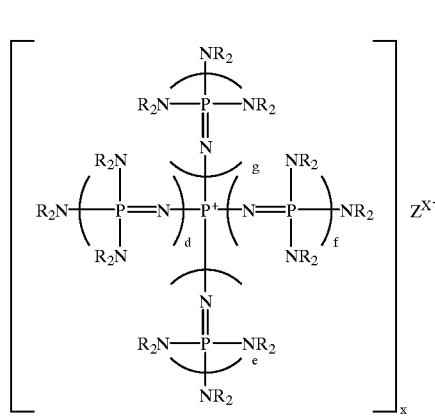

wherein d, e, f and g are individually a positive integer of 3 or less or 0 and are not all 0 at the same time, R's are the same or different hydrocarbons having 1 to 10 carbon atoms, and two R's located on each common nitrogen atom may be coupled together to form a ring structure, X indicates the number of phosphazenium cations, $Z^{x-}$ is an anion of a X-valent active hydrogen compound.

The symbols a, b and c in the phosphazenium compound represented by the formula (1) are individually a positive integer of 3 or less or 0. Preferably, a positive integer of 2 or less or 0, more preferably values of the combination selected from (2,1,1), (1,1,1), (0,1,1,) and (0,0,1) irrespective of the order of a, b and c.

Further, the symbols d, e, f and g in the phosphazenium compound represented by the formula (2) are individually a positive integer of 3 or less or 0. Preferably, a positive integer of 2 or less or 0, more preferably values of the combination selected from (2,1,1,1), (1,1,1,1), (0,1,1,1), (0,0,1,1) and (0,0,0,1) irrespective of the order of d, e, f and g, most preferably values of the combination selected from (1,1,1,1), (0,1,1,1), (0,0,1,1) and (0,0,0,1).

R's in the phosphazenium compound represented by the formula (1) or (2) are the same or different aliphatic or aromatic hydrocarbon groups having 1 to 10 carbon atoms.

R is specifically selected from the aliphatic and aromatic hydrocarbon groups, for example, methyl, ethyl, n-propyl, isopropyl, allyl, n-butyl, sec-butyl, tert-butyl, 2-butenyl, 1-pentyl, 2-pentyl, 3-pentyl, 2-methyl-1-butyl, isopentyl, tert-pentyl, 3-methyl-2-butyl, neopentyl, n-hexyl, 4-methyl-2-pentyl, cyclopentyl, cyclohexyl, 1-heptyl, 3-heptyl, 1-octyl, 2-octyl, 2-ethyl-1-hexyl, 1,1-dimethyl-3,3-dimethylbutyl (a common name: tert-octyl), nonyl, decyl, phenyl, 4-tolyl, benzyl, 1-phenylethyl and 2-phenylethyl. Among these groups, aliphatic hydrocarbon groups having 1 to 10 carbon atoms, such as methyl, ethyl, n-propyl, isopropyl, tert-butyl, tert-pentyl and 1,1-dimethyl-3,3-dimethylbutyl are preferably used; methyl and ethyl groups are more preferably used.

When two R's located on the same nitrogen atom in the phosphazenium compound represented by the formula (1) or the formula (2) are coupled together to form a ring structure; divalent groups (R—R) on the nitrogen atom are divalent hydrocarbon group having 4 to 6 carbon atoms as main group such as tetra-methylene, penta-methylene or hexa-methylene (the ring structure is 5 to 7 membered ring containing a nitrogen atom), and the main group may be substituted by alkyl group such as methyl, ethyl and other low alkyl group, preferably tetra-methylene or penta-methylene.

All or only part of nitrogen atoms in the phosphazenium cation can thus form ring structures.

X's in the phosphazenium compound represented by the formula (1) and the formula (2) differ in kinds of an active hydrogen compound, and is usually 1 to 8, preferably 1.

The phosphazenium compound represented by the formula (1) or the formula (2) can be prepared by reacting a salt of an inorganic anion with a cation of phosphazenium in the formula (1) or (2) and an alkaline metal salt or alkaline earth metal of an active hydrogen compound, or by reacting a salt of an anion of an active hydrogen compound with a cation of phosphazenium in the formula (1) or (2) and an active hydrogen compound.

The phosphazenium compound represented by the formula (1) can also be prepared by reacting a phosphazene compound represented by the formula (4):

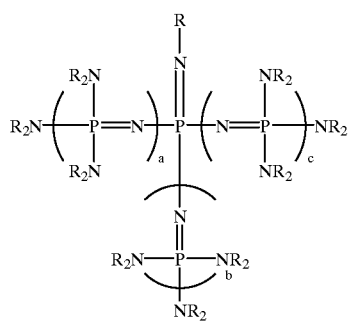

(4)

wherein a, b and c are individually a positive integer of 3 or less or 0 and are not all 0 at the same time, R's are the same or different hydrocarbons having 1 to 10 carbon atoms, and two R's located on each common nitrogen atom may be coupled together to form a ring structure, with an active hydrogen compound.

Any other preparation process for obtaining the phosphazenium compound represented by the formula (1) or (2) can be applied.

An active hydrogen compound which are reacted with phosphazene compound represented by the formula (4) is a compound having an active hydrogen atom on an oxygen atom include, for example, water; carboxylic acids having 1 to 20 carbon atoms, such as formic acid, acetic acid, propionic acid, butyric acid, isobutyric acid, caproic acid, lauric acid, stearic acid, oleic acid, phenylacetic acid, dihydrocinnamic acid, cyclohexanecarboxylic acid, benzoic acid, p-methyl benzoic acid and naphthalene-2-carboxylic acid; polycarboxylic acids having 2 to 20 carbon atoms and 2 to 6 carboxyl groups, such as oxalic acid, malonic acid, succinic acid, maleic acid, fumaric acid, adipic acid, itaconic acid, butanetetracarboxylic acid, phthalic acid, isophthalic acid, terephthalic acid, trimellitic acid and pyromellitic acid; carbamic acids, such as N,N-diethylcarbamic acid, pyrrolidone-N-carboxylic acid, aniline-N-carboxylic acid and 2,4-toluenediamino-N,N'-dicarboxylic acid; alcohols having 1 to 20 carbon atoms, such as methanol, ethanol, n-propanol, isopropanol, n-butyl alcohol, sec-butyl alcohol, tert-butyl alcohol, isopentyl alcohol, tert-pentyl alcohol, n-octyl alcohol, lauryl alcohol, cetyl alcohol, cyclopentyl alcohol, cyclohexyl alcohol, allyl alcohol, crotyl alcohol, methyl vinyl carbinol, benzyl alcohol, 1-phenylethyl alcohol, triphenyl carbinol and cinnamyl alcohol; polyhydric alcohols having 2 to 20 carbon atoms and 2 to 8 hydroxyl groups, such as ethylene glycol, propylene glycol, diethylene glycol, dipropylene glycol, 1,3-propanediol, 1,3-butanediol, 1,4-butanediol, 1,6-hexanediol, 1,4-cyclohexanediol, trimethylolpropane, glycerol, diglycerol, pentaerythritol and dipentaerythritol; saccharides and derivatives thereof, such as glucose, sorbitol, dextrose, fructose and sucrose; and aromatic hydroxy compounds having 6 to 20 carbon atoms and 1 to 3 hydroxyl groups, such as phenol, cresol, xylenol, anisole, 2-naphthol, naphthalene-2, 6-diol and bisphenol-A.

Polyalkylene oxides are, for example, polyethyleneoxide, polypropyleneoxide and copolymers thereof and have 2 to 8 terminals in the molecule and further have 1 to 8 hydroxyl groups on the terminal.

Exemplary active hydrogen compounds having an active hydrogen atom on a nitrogen atom include, for example, aliphatic or aromatic primary amines having 1 to 20 carbon atoms, such as methylamine, ethylamine, n-propylamine, isopropylamine, n-butylamine, isobutylamine, sec-butylamine, tert-butylamine, cyclohexylamine, benzylamine, β-phenylethylamine, aniline, o-toluidine, m-toluidine and p-toluidine; aliphatic or aromatic secondary amines having 2 to 20 carbon atoms, such as dimethylamine, methylethylamine, diethylamine, di-n-propylamine, ethyl-n-butylamine, methyl-sec-butylamine, dipentylamine, dicyclohexylamine, N-methylaniline and diphenylamine; polyamines having 2 to 20 carbon atoms and 2 to 3 primary or secondary amino groups, such as ethylenediamine, di(2-aminoethyl)amine, hexamethylenediamine, 4,4'-diaminodiphenylmethane, tri(2-aminoethyl) amine, N,N'-dimethylethylenediamine, N,N'-diethylethylenediamine and di(2-methylaminoethyl)amine; saturated cyclic secondary amines having 4 to 20 carbon atoms, such as pyrrolidine, piperidine, morpholine and 1,2,3,4-tetrahydroquinoline; unsaturated cyclic secondary amines having 4 to 20 carbon atoms, such as 3-pyrroline, pyrrole, indole, carbazol, imidazole, pyrazole and purine; cyclic polyamines having 4 to 20 carbon atoms and 2 to 3 secondary amino groups, such as piperazine, pyrazine and 1,4,7-triazacyclononane; unsubstituted or N-monosubstituted acid amides having 2 to 20 carbon atoms, such as acetamide, propionamide, N-methylpropionamide, N-methylbenzoylamide and N-ethylstearylamide; 5 to 7 membered cyclic amides, such as 2-pyrrolidone and ε-caprolactam; and dicarboxylic acid imides having 4 to 10 carbon atoms, such as succinimide, maleimide and phthalimide.

In these active hydrogen compounds, more preferred compounds include for example, water; alcohols having 1 to 20 carbon atoms, such as methanol, ethanol, n-propanol, isopropanol, n-butyl alcohol, sec-butyl alcohol, tert-butyl alcohol, isopentyl alcohol, tert-pentyl alcohol, n-octyl alcohol, lauryl alcohol, cetyl alcohol, cyclopentyl alcohol, cyclohexyl alcohol, allyl alcohol, crotyl alcohol, methyl vinyl carbinol, benzyl alcohol, 1-phenylethyl alcohol, triphenyl carbinol and cinnamyl alcohol; polyhydric alcohols having 2 to 20 carbon atoms and 2 to 8 hydroxyl groups, such as ethylene glycol, propylene glycol, diethylene glycol, dipropylene glycol, 1,3-propanediol, 1,3-butanediol, 1,4-butanediol, 1,6-hexanediol, 1,4-cyclohexanediol, trimethylolpropane, glycerol, diglycerol, pentaerythritol and dipentaerythritol; saccharides and derivatives thereof, such as glucose, sorbitol, dextrose, fructose and sucrose; polyalkylene oxides having molecular weight of 100 to 50,000, 2 to 8 terminals in the molecule and 1 to 8 hydroxyl groups on the terminal, such as polyethyleneoxide, polypropyleneoxide and copolymers thereof; polyamines having 2 to 20 carbon atoms and 2 to 3 primary or secondary amino groups, such as ethylenediamine, di(2-aminoethyl)amine, hexamethylenediamine, 4,4'-diaminodiphenylmethane, tri (2-aminoethyl)amine, N,N'-dimethylethylenedi amine, N,N'-diethylethylenediamine and di(2-methylaminoethyl) amine; saturated cyclic secondary amines having 4 to 20 carbon atoms, such as pyrrolidine, piperidine, morpholine and 1,2,3,4-tetrahydroquinoline; cyclic polyamines having 4 to 20 carbon atoms and 2 to 3 secondary amino groups, such as piperazine, pyrazine and 1,4,7-triazacyclononane.

Representative active hydrogen compounds which can be more preferably used include, for example, water; alcohols having 1 to 10 carbon atoms, such as methanol, ethanol, n-propanol, isopropanol, n-butyl alcohol, sec-butyl alcohol, tert-butyl alcohol, isopentyl alcohol, tert-pentyl alcohol and n-octyl alcohol; polyhydric alcohols having 2 to 10 carbon atoms and 2 to 4 hydroxyl groups, such as ethylene glycol, diethylene glycol, propylene glycol, dipropylene glycol, 1,4-butanediol, trimethylolpropane, glycerol and pentaerythritol; polyalkylene oxides having 100 to 10,000 of molecular weight, 2 to 6 terminals in the molecule and 2 to 6 hydroxyl groups on the terminal, such as polyethyleneoxide, polypropyleneoxide and copolymers thereof; polyamines having 2 to 20 carbon atoms and 2 to 3 primary or secondary amino groups, such as N,N'-dimethylethylenediamine, N,N'-diethylethylenediamine and di(2-methylaminoethyl)amine; cyclic polyamines having 4 to 20 carbon atoms and 2 to 3 secondary amino groups, such as piperazine, pyrazine and 1,4,7-triazacyclononane. Most preferably, water; polyhydric alcohols having 2 to 10 carbon atoms and 2 to 4 hydroxyl groups, such as ethylene glycol, diethylene glycol, propylene glycol, dipropylene glycol, 1,4-butanediol, trimethylolpropane, glycerol and pentaerythritol; polyalkylene oxides having 100 to 10,000 of molecular weight, 2 to 6 terminals in the molecule and 2 to 6 hydroxyl groups on the terminal, such as polyethyleneoxide, polypropyleneoxide and copolymers thereof.

Representative alkylene oxides which can be used for preparing polyols in the presence of the phosphazenium compound represented by the formula (1) or (2) include, for example, ethylene oxide, propylene oxide, 1,2-butylene oxide, 2,3-butylene oxide, styrene oxide, cyclohexene oxide, epichlorohydrin, epibromohydrin, methyl glycidyl ether, allyl glycidyl ether, phenyl glycidyl ether and other epoxy compounds. These epoxy compounds can be used singly or as a mixture. When using as a mixture, these epoxy compounds can be used in combination, in a successive combination, or in repeating the successive combination.

In these alkylene oxide compounds, ethylene oxide, propylene oxide, 1,2-butylene oxide and styrene oxide are preferably used, and ethylene oxide and propylene oxide are more preferably used.

Amount of the phosphazenium compound which can be used for the polymerization of alkylene oxide compound is not limited specifically, and is usually in the range of $1 \times 10^{-15}$ to $5 \times 10^{-1}$ mol, preferably $1 \times 10^{-7}$ to $1 \times 10^{-5}$ mol for 1 mol of alkylene oxide compound.

Polymerization temperature varies depending upon the species and amount of alkylene oxide and other ingredients, and is usually in the range of 150° C. or less, preferably 10 to 130° C., more preferably 50 to 120° C. Reaction pressure varies depending upon the species and amount of alkylene oxide and other ingredients and polymerization temperature, and is usually in the range of 30 kg/cm² or less (absolute pressure, hereinafter shall be the same), preferably 0.1 to 15 kg/cm², more preferably 1 to 10 kg/cm².

Next, polymer polyol of the invention can be obtained by dispersion polymerization of an unsaturated compound such as acrylonitrile and styrene in the polyol in the presence of a radical initiator such as azobisisobutyronitrile.

The resulting polymer polyol is a dispersion of polymer micro particles and portionally comprises grafted polymers.

The proportion of the polymer microparticles in polymer polyol is preferably in the range of 2 to 50 wt %, more preferably 10 to 40 wt %.

No particular restriction is imposed upon other conventionally known polyol other than the polyol prepared in the presence of a compound having a nitrogen-phosphorus double bond as a catalyst, a polyol used usually as a polyol ingredient can also be used in the present invention.

A polyoxyalkylene polyether polyol obtained by reacting the above mentioned alkyleneoxide on the above mentioned active hydrogen compound in the presence of a catalyst usually used for polymerization of polyol, for example, alkali metal hydroxide such as potassium hydroxide, cesium hydroxide, diethyl zinc, iron chloride, metallic porphyrin and metal cyanide complex are included, as the above polyols.

Further, as the above polyol, polyester polyol obtained by addition reaction of alcohols with acid anhydrides, by polycondensation reaction of alcohols with polycarboxylic acid or by addition of alkyleneoxide on polycarboxylic acid are included. In these methods, acid anhydrides include for example, maleic anhydride, succinic anhydride, trimellitic anhydride, pyromellitic anhydride, itaconic anhydride, phthalic anhydride, glutaric anhydride, glutaconic anhydride, diglycolic anhydride, citraconic anhydride, diphenic anhydride and toluic anhydride; polycarboxylic acids include, for example, maleic acid, terephthalic acid, dimethylterephthalic acid, isophthalic acid, fumaric acid, succinic acid, malonic acid, glutaric acid, adipic acid, pimelic acid, speric acid, azeric acid, cebacic acid, citric acid, trimellitic acid and other polyvalent carboxylic acids mentioned above as active hydrogen compounds; and alcohols include, for example, alcohols mentioned above as active hydrogen compounds, phenols, and alkylene oxides mentioned above as active hydrogen compounds.

The ethylenically unsaturated monomer which can be used for preparing polymer dispersed polyol suitably has one or more polymerizable, ethylenically unsaturated group. Unsaturated monomers include, for example, acrylonitrile, methacrylonitrile and other cyano group containing monomers; methyl acrylate, butyl acrylate, stearyl acrylate, hydroxyethyl acrylate, dimethylaminoethylacrylate, dimethylaminopropyl methacrylate and other acrylate and methacrylate ester based monomers, acrylic acid, methacrylic acid, itaconic acid, maleic acid, fumaric acid and other monomers having a carboxyl group; maleic anhydride, itaconic anhydride and other monomers having an acid anhydride group; butadiene, isoprene, 1,4-pentadiene and other hydrocarbon based monomers; styrene, α-methylstyrene, phenylstyrene, chlorostyrene and other aromatic hydrocarbon based monomers; vinyl chloride, vinylidene chloride and other halogen containing monomers; vinylethyl ether, vinyl butyl ether and other vinyl ethers; vinyl ethyl ketone, and other vinyl ketones; vinyl acetate and other vinyl esters; acrylamide, N,N-dimethylacrylamide, N-isopropylacrylamide, N,N-dimethylaminopropylacrylamide, methylenebisacrylamide and other acrylamide species; and N,N-dimethylmethacryloyl amide. These monomers can be used singly or as a mixture. Preferred monomers are acrylonitrile singly, a mixture of acrylonitrile and styrene, and a mixture of acrylonitrile, styrene and methyl methacrylate, and mixture of acrylonitrile, styrene and acrylamide.

The ethylenically unsaturated monomers are preferably used singly or as a mixture, and can also be used in combination with a dispersion stabilizer and chain transfer agent.

The polymerization initiator used for preparation of polymer dispersed polyol is usually a radical initiator which generates a radical and initiates polymerization. Exemplary initiators include, for example, 2,2-azobisisobutyronitrile and other azo compounds; benzoyl peroxide, tert-butyl peroxide, di-tert-butyl peroxide and other peroxide; and peroxy disulfides. Amount of the polymerization initiator is usually 0.1 to 10.0 wt %, preferably 0.5 to 5 wt % for the ethylenically unsaturated monomer.

Amount of the ethylenically unsaturated monomer is usually 2 to 60 wt %, preferably 2 to 50 wt %, more preferably 5 to 40 wt % for the total amount of polyoxyalkylene polyol and ethylenically unsaturated monomer. When the amount of ethylenically unsaturated monomers is less than 2 wt %, polymer dispersed polyol thus obtained cannot give sufficient modification effect on the polyurethane properties such as hardness. On the other hand, the amount of the unsaturated monomer exceeding 60 wt % results in remarkable increase in the viscosity of polymer dispersed polyol obtained and impairment of dispersing ability.

A chain transfer agent can be used, when necessary, in the preparation of polymer dispersed polyol. Exemplary chain transfer agents include, isopropanol and other alcohols, mercaptans, halogenated hydrocarbons, triethylamine, tripropylamine, tributylamine, N,N-diethylethanolamine and other aliphatic tertiary amines; N-methylmorpholine, N-ethylmorpholine and other morpholine compounds; sodium methallylsulfonate and sodium allylsulfonate. Preferred chain transfer agent is single use of triethylamine and a mixture of triethylamine and isopropanol. Amount of the chain transfer agent is preferably 0.1 to 10.0 wt % for the total amount of polyoxyalkylene polyol and ethylenically unsaturated monomer.

Further, polymerization can also be carried out in the presence of a dispersion stabilizer in order to make a stable dispersion of the polymer microparticles in polyol. Exemplary dispersion stabilizers include polyester polyol having a carbon-carbon unsaturated bond, and modified polyol having an acrylic group, methacryl group or allyl group on the end of molecule. High molecular weight polyoxyalkylene polyol and polyester polyol having substantially no carbon-carbon unsaturated bond can also be used.

Polymer dispersed polyol can be prepared by polymerization reaction using the above polyoxyalkylene polyol, ethylenically unsaturated monomer, polymerization initiator, and when necessary, chain transfer agent and dispersion stabilizer.

Polymerization reaction can be carried out batch wise or continuously. Polymerization temperature is determined by referring to the species of polymerization initiator and is higher than decomposition temperature of the polymerization initiator, preferably in the range of 60 to 200° C., more preferably 90 to 150° C. Polymerization can be carried out both under increased pressure and in the atmospheric pressure.

Polymerization can be carried out without solvent and also carried out in the presence of one or more solvents selected from water and organic solvents, or a mixture of water and the organic solvent.

Exemplary organic solvents include, for example, toluene, xylene, acetonitrile, hexane, heptane, dioxane, ethylene glycol dimethyl ether, N,N-dimethylformamide, butanol and isopropanol.

After finishing the polymerization reaction, polymer dispersed polyol obtained can be used as is for the raw material and is preferably used after distilling off the unreacted ethylenically unsaturated monomer, decomposition product of the polymerization initiator, chain transfer agent, dispersion stabilizer, and solvent under reduced pressure.

Polymer microparticles contained in the polymer dispersed polyol of the invention have preferably an average particle size of 0.01 to 10 $\mu$m in view of dispersion stability of the polymer and effect on form properties. Such particle size of the polymer can be obtained by suitably controlling the species and amount of the above chain transfer agent, dispersion stabilizer and solvent, and the composition by weight of the ethylenically unsaturated monomers.

Polymer polyol is used singly or as a mixture with polyol. A mixture of the polymer polyol can also be used is combination with a mixture of polyol.

When 20 wt % or more of the total polyol ingredients which is comprised of polymer polyol or a mixture of polymer polyol and polyol is occupied by the polyol prepared in the presence of a compound having a nitrogen-phosphorus double bond as a catalyst, such polyol can be preferably used for the flexible polyurethane foam of the invention and a preparation process of the foam. The amount of the polyol of the invention is preferably 30 wt % or more, more preferably 40 wt % or more. The remainder of the polyol is conventionally known polyol and/or polymer polyol, and polyester polyol can also be used.

The polyol used in the invention has preferably a functionality of 2 to 8 in the active hydrogen compound initiator, hydroxyl value of 5 to 60 mg KOH/g, and proportion of ethylene oxide in the total alkylene oxide of 5 to 30 wt %. The polyol more preferably has a functionality of 2 to 6, hydroxyl value of 10 to 40 mg KOH/g, and proportion of ethylene oxide in alkylene oxide of 5 to 30 wt %, and most preferably has a functionality of 3 to 4, hydroxyl value of 15 to 35 mg KOH/g, and proportion of ethylene oxide in alkylene oxide of 10 to 20 wt %.

On preparation of polyol by polymerization of propylene oxide, ring-opening polymerization is the main reaction and additionally, a side reaction forms monool.

When propylene oxide is polymerized, two kinds of arrangement take place. In one arrangement, a methyl side chain locates on the adjacent carbon atom. In the other arrangement, the methyl group locates on the carbon atom which inserts a methylene group (head-to-tail linkage).

The monool which can be preferably used in the invention has a monool content of 15 mol % or less and head-to-tail linkage selectivity of 96% or more.

Polymer polyol of the invention contains a polymer of unsaturated compound in an amount of preferably 2 to 60 wt %, more preferably 2 to 50 wt %, most preferably 10 to 40 wt %.

Preferred unsaturated compound is acrylonitrile and styrene and is used singly or as a mixture. A dispersion stabilizer and/or chain transfer agent can be used in combination.

A crosslinking agent is not always used. However, when the cross linking agent is required, a compound having a hydroxyl value of 200 to 1800 mg KOH/g is used. Exemplary compounds which can be used are, for example, glycerol and other aliphatic polyhydric alcohols, and diethanolamine, triethanol amine and other alkanolamines. Polyoxyalkylene polyol having a hydroxyl value of 200 to 1800 mg KOH/g and other conventionally known crosslinking agents can also be used in an amount of 0.5 to 10 parts for 100 parts of polyol and/or polymer dispersed polyol.

The flexible polyurethane foam with high-durability of the invention can be prepared from the above polyol and/or polymer polyol, water, catalyst, surfactant, other auxiliary agents and polyisocyanate.

The surfactants which can be used are commonly available organic silicone based surface active agents in an amount of 0.2 to 3 parts for 100 parts of polyol and/or polymer dispersed polyol. Exemplary surfactants are SRX-274C, SF-2969, SF-2961 and SF-2962 which are manufactured by Torey•Dow Corning Silicone Co.; and L-5309, L-3601, L-5307 and L-3600 which are manufactured by Nippon Unicar Co.

No particular restriction is imposed upon the catalyst and conventionally known catalysts can be used. The amount of the catalyst is preferably 0.005 to 10 parts for 100 parts of polyol and/or polymer dispersed polyol.

Representative catalysts which can be used include, for example, triethylendiamine, bis(N,N-dimethylaminoethyl ether), morpholine and other aliphatic amine; and tin octoate, dibutyltin dilaurate and other organic tin compounds. These catalysts can be used singly or as a mixture.

Water generates carbon dioxide gas by reacting with isocyanate and thus can be used as a blowing agent. Commonly used amount is preferably 2 to 7 parts, more preferably 2.5 to 6 parts for 100 parts of polyol and/or polymer dispersed polyol.

Chlorofluorocarbons which have been developed in order to protect global environment, hydroxychlorofluorocarbons (HCFC-134A), hydrocarbons(cyclopentane), and other blowing agents can be used as a blowing additive in combination with water without impairing the object of the invention.

Polyol, polymer polyol, a mixture of polymer polyol and polyol, and when necessary, crosslinking agent, surfactant, water and catalyst are mixed to prepare a resin premix.

Other auxiliary agents include a flame retardant, colorant, ultraviolet absorber and antioxidant. These auxiliary agents can be used, when necessary, without impairing the object of the invention.

The resin premix is used by mixing with isocyanate usually in a high pressure foaming machine or a moderate pressure foaming machine.

When an organic tin or other hydrolyzable compounds are used for the catalyst, water ingredient and the organic tin catalyst ingredient are fed through a separate line in order to avoid contact with water and preferably mixed in a mix-mixing head.

No particular restriction is imposed upon isocyanate which reacts with resin premix.

Preferred isocyanate is conventionally known tolylene diisocyanate having a 2,4-/2,6-isomer ratio of 80/20, that ratio is not particularly restricted; and a mixture of tolylene diisocyanate with polymethylene polyphenyl polyisocyanate represented by the formula (3):

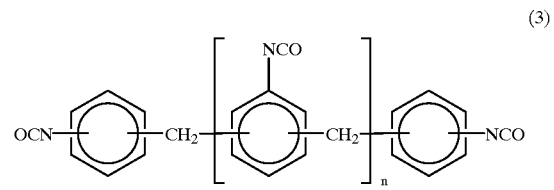

wherein n is 0 or an integer of 1 or more, and manufactured by Mitsui Chemicals Inc. with a Trade Mark: Cosmonate M-200.

When n=0 in the formula (3), the isocyanate consists of 2,4'-isomer, 4,4'-isomer and 2,2'-isomer and the content of 2,2'-isomer is usually trace and 2,4'-isomer is less than 10%. The proportion of ingredient having n=0 is less than 50% in polymeric diphenylmethane diisocyanate. When polyisocyanate is a mixture of tolylene diisocyanate and polymethylenepolyphenyl polyisocyanate, a mixing ratio of 98:2 to 50:50 by weight is particularly suited for preparation of flexible polyurethane foam.

A composition of polymethylenepolyphenyl polyisocyanate can also be used preferably. In a specifically preferred composition, diphenylmethane diisocyanate occupies 30 to 95 wt %, the isomer ratio of 2,4'-diphenylmethane diisocyanate to 4,4'-diphenylmethane diisocyanate is 1:99 to 50:50, and residual 70 to 5 wt % is polymethylenepolyphenyl polyisocyanate having n≧1 in the formula (3):

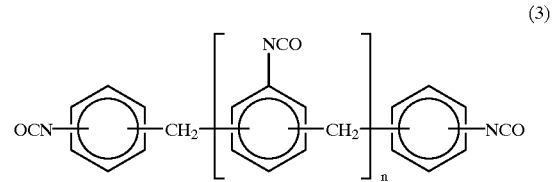

wherein n is 0 or an integer of 1 or more.

The composition is a mixture of isocyanate or a urethane modified derivative of the isocyanate, and has an NCO content of preferably 15 to 31 wt %.

A mixture of isocyanate or a urethane modified derivative of the isocyanate of polymethylenepolyphenyl polyisocyanate composition and tolylene diisocyanate can also be used preferably. Suitable amount of tolylene diisocyanate is 1 to 70 wt % in polyisocyanate.

When the amount of isocyanate group is stoichiometrically equivalent to the amount of functional groups having active hydrogen, which react with isocyanate group, such as hydroxyl group and amino group, in the resin premix, prepared the flexible polyurethane foam, the NCO index is defined as 100. The NCO index in the invention is preferably 70 to 140.

No particular restriction is imposed upon the method for carrying out the invention. Resin premix and polyisocyanate are usually mixed by using a high pressure foaming machine or a moderate pressure foaming machine. The low pressure foaming machine can mix components exceeding 2, and thus polyol, water, organic tin catalyst, flame retardant and isocyanate can be separately fed to the mixing head and mixed. The raw material mixture is delivered from the mixing head of the foaming machine, foamed and cured to prepare a flexible polyurethane foam and cut into the desired shape. Alternatively, the raw material mixture is poured into a mold, formed, filled into the mold and cured to obtain desired products having a prescribed shape. Curing time is usually 30 seconds to 30 minutes, mold temperature is room temperature to 80° C., and curing temperature is room temperature to 180° C. to manufacture flexible polyurethane foam.

The invention will hereinafter be illustrated further in detail by way of examples. However, these examples do not limit the scope of the invention. In these examples, part and % mean part by weight and % by weight, respectively.

POLYOXYALKYLENE POLYOL SYNTHESIS EXAMPLE-1

Polyoxyalkylene polyol-A:

To 1 mol of glycerol, 0.01 mol of tetrakis[tris (dimethylamino) phosphoranilideneamino)phosphonium hydroxide was added and dehydrated at 100° C. for 6 hours under reduced pressure.

Successively, propylene oxide was addition-polymerized at 80° C. under the maximum pressure of 3.8 kg/cm$^2$, followed by addition polymerization of ethylene oxide at 100° C. to obtain polyoxyalkylene polyol having a hydroxyl value of 21 mg KOH/g. Content of terminal oxyethylene group was 15 wt %.

Liquid chromatography was carried out on the polyoxyalkylene polyol with a liquid chromatograph apparatus manufactured by Nippon Bunko Co. Liquid chromatogram was measured. The monool content was examined on the basis of the area ratio between triol and monool. The monool content was 10.5 mol %.

Further, C13-Nuclear Magnetic Resonance of polyoxyalkylene polyol was examined with a C13-NMR apparatus of 400 MHz manufactured by Nippon Denshi Co.

Deuterized chloroform was used as a solvent. In the examination of a C13-NMR spectrum, a signal of methyl group (16.9 to 17.4 ppm) on an oxypropylene segment having a Head-to-Tail linkage and a signal of methyl group (17.7 to 18.5 ppm) on an oxypropylene segment having a Head-to-Head linkage were checked. The selectivity was calculated from the area ratio of these two signals. Polyoxyalkylene polyol had a Head-to-Tail linkage selectivity of 96.8 mol %. The assignment of each signal was referred to the value described in the report, F. C. Schiling and A. E. Tonelli, Macromolecules, 19, 1337 to 1343 (1986).

Hereinafter, polyoxyalkylene polyols B to E were prepared by the same process. Table 1 illustrates structure and analysis of polyoxyalkylene polyols A to E.

When the number of hydroxyl group is 3, glycerol was used as an active hydrogen compound. When the number of hydroxyl group is 4, pentaerythritol was used as an active hydrogen compound.

TABLE 1

| Polyol | A | B | C | D | E |
|---|---|---|---|---|---|
| Number of hydroxyl groups | 3 | 3 | 3 | 4 | 3 |
| Hydroxyl value (mg KOH/g) | 21 | 24 | 28 | 24 | 45 |
| Terminal oxyethylene group content (wt %) | 15 | 15 | 15 | 15 | 15 |
| Monool content (mol %) | 9.7 | 7.7 | 7.0 | 13.6 | 4.2 |
| Head-to-Tail selectivity (mol %) | 96.8 | 97.2 | 97.3 | 96.9 | 97.4 |

POLYOXYALKYLENE POLYOL SYNTHESIS EXAMPLE-2 polyoxyalkylene polyol-F:

To 1 mol of glycerol, 0.37 mol of potassium hydroxide was added and dehydrated at 100° C. for 6 hours under reduced pressure and successively addition polymerization of propylene oxide was carried out at 115° C. under increased pressure of 5.0 kg/cm$^2$, followed by addition polymerization of ethylene oxide at 115° C. to obtain polyoxyalkylene polyol having a hydroxyl value of 24 mg KOH/g. Content of terminal oxyethylene group was 15 wt %.

Monool content and head-to-tail selectivity were measured by the same procedures as Synthesis Example 1.

Monool content was 35.5 mol % and head-to-tail linkage selectivity was 96.3 mol %.

Polyoxyalkylene polyols G and H were prepared by the same procedures as Synthesis Example 2.

Table 2 illustrates structure and analytical values of polyoxyalkylene polyols F to H.

POLYOXYALKYLENE POLYOL SYNTHESIS EXAMPLE-3

Polyoxyalkylene polyol-I:

To 1 mol of glycerol, 6.93 g of a so-called composite metal cyanide complex catalyst comprised of zinc.cobalt cyanide compound and zinc chloride, water and dimethoxy ethanol was added and propylene oxide was addition polymerized at 90° C. under the pressure of 4.0 kg/cm$^2$ to obtain polyoxyalkylene polyol having a hydroxyl value of 33 mg KOH/g.

The above composite metal cyanide complex was extracted with aqueous ammonia and resultant polyoxyalkylene polyol was purified by washing with water. Successively, 0.23 mol of potassium hydroxide was added for 1 mol of glycerol and dehydrated at 100° C. for 6 hours under reduced pressure. Thereafter, ethylene oxide is addition polymerized at 100° C. to obtain polyoxyalkylene polyol having a hydroxyl value of 28 mg KOH/g. Terminal oxyethylene content was 15 wt %.

The monool content and head-to-tail selectivity were measured by the same procedures as Synthesis Example 1.

Polyol thus obtained had a monool content of 9.6 mol %, and head-to-tail linkage selectivity of 85.4 mol %.

Table 2 illustrates structure and analysis value of polyoxyalkylene polyol I.

TABLE 2

| Polyol | F | G | H | I |
|---|---|---|---|---|
| Number of hydroxyl groups | 3 | 3 | 4 | 3 |
| Synthesis catalyst | | Potassium hydroxide | | composite metal cyanide complex |
| Hydroxyl value (mg KOH/g) | 24 | 28 | 24 | 24 |
| Terminal oxyethylene group content (wt %) | 15 | 15 | 15 | 15 |
| Monool content (mol %) | 35.5 | 29.3 | 38.0 | 9.6 |
| Head-to-Tail selectivity (mol %) | 96.4 | 96.3 | 96.5 | 85.4 |

POLYMER POLYOL SYNTHESIS EXAMPLE 1

Polymer polyol a:

Polymer polyol which had a hydroxyl value of 20 mg KOH/g, and was obtained by graft polymerization of acrylonitrile in polyether polyol B having a hydroxyl value of 24 mg KOH/g. Vinyl polymer content was 20 wt %.

POLYMER POLYOL SYNTHESIS EXAMPLE 2

Polymer polyol b:

Polymer polyol which had a hydroxyl value of 23 mg KOH/g, and was obtained by graft polymerization of acrylonitrile in polyether polyol C having a hydroxyl value of 28 mg KOH/g. Vinyl polymer content was 20 wt %.

POLYMER POLYOL SYNTHESIS EXAMPLE 3

Polymer polyol c:

Polymer polyol which had a hydroxyl value of 23 mgKOH/g, and was obtained by graft polymerization of acrylonitrile in polyether polyol G having a hydroxyl value of 28 mgKOH/g. Vinyl polymer content was 20 wt %.

Raw-materials shown below were used as isocyanate.

Isocyanate 1

Cosmonate TM-20: manufactured by Mitsui Chemicals Inc.

A mixture of tolylene diisocyanate and polymethylene polyphenyl polyisocyanate in a weight ratio of 80:20 where tolylene diisocyanate is a 80:20 weight ratio mixture of 2,4-tolylene diisocyanate and 2,6-tolylene diisocyanate.

Following additives were used in addition to the above polyoxyalkylene polyol, polymer polyol and isocyanate.

Catalyst 1

Minico L-1020: manufactured by Katsuzai Chemicals Co.

An amine catalyst, a 33% diethylene glycol solution of triethylene diamine.

Catalyst 2

Niax A-1: Amine catalyst manufactured by Arco Co.

Crosslinking agent 1

KL-210: manufactured by Mitsui Chemicals Inc.

An amine base crosslinking agent having a hydroxyl value 830 mg KOH/g

Surfactant-1: SRX-274C manufactured by Toray•Dow Corning•Silicone Co.

A silicone surfactant

In the examples and comparative examples, density means overall density.

Example 1

Resin premix was prepared by mixing the following 7 ingredients.

| | |
|---|---|
| Polyoxyalkylene polyol | 60 parts |
| Polymer polyol | 40 parts |
| Crosslinking agent-1 | 3.0 parts |
| Water | 3.0 parts |
| Catalyst-1 | 0.5 parts |
| Catalyst-2 | 0.1 parts |
| Surfactant-1 | 1.0 parts |

Polyoxyalkylene polyol A and polymer polyol a were used as polyol ingredients. With 107.6 parts of the above resin premix, 39 parts of isocyanate-1 was mixed and immediately poured into a metal mold which had internal dimensions of 400×400×100 mm and was previously regulated to 60° C. The lid of the mold was closed and allowed to foam.

After hot curing in a hot air oven at 100° C. for 7 minutes, flexible foam was taken out of the mold.

Properties of the foam obtained are shown in Table 3.

In the example, equivalent ratio of isocyanate to the active hydrogen of the resin premix (NCO/H) was 1.00.

EXAMPLES 2 TO 7

The same procedures as Example 1 were carried out except that polyoxyalkylene polyol A was replaced by polyoxyalkylene polyols B to E and polymer polyol a was replaced by polymer polyols a to c.

Properties of the flexible foam obtained are shown in Table 3.

EXAMPLE 8

The same procedures as Example 7 were carried out except that 40 parts of polyoxyalkylene polyol and 60 parts of polymer polyol were used.

TABLE 3

| Example | 1 | 2 | 3 | 4 | 5 | 6 | 7 | 8 |
|---|---|---|---|---|---|---|---|---|
| Polyol | A | B | C | D | E | B | B | B |
| Polymer polyol | a | a | a | a | a | b | c | c |
| Polyol proportion (wt %) 1) | 100 | 100 | 100 | 100 | 100 | 100 | 65 | 45 |
| Overall density (kg/m$^3$) 2) | 55.2 | 55.1 | 55.3 | 54.8 | 55.2 | 55.1 | 55.0 | 54.8 |
| Hardness, 25% ILD (kgf/314 cm$^2$) 2) | 17.5 | 18.0 | 19.1 | 18.5 | 19.4 | 18.3 | 17.4 | 20.8 |
| Wet compression set (%) 2) | 7.4 | 7.5 | 8.0 | 7.7 | 10.8 | 8.4 | 9.6 | 11.2 |
| Fatigue by constant-load pounding 2) | | | | | | | | |
| Hardness loss (%) | 5.8 | 6.2 | 6.7 | 6.5 | 8.7 | 7.4 | 9.6 | 11.4 |
| Height loss (%) | 0.6 | 0.5 | 0.7 | 0.7 | 1.2 | 0.7 | 1.1 | 1.3 |

TABLE 3-continued

| Example | 1 | 2 | 3 | 4 | 5 | 6 | 7 | 8 |
|---|---|---|---|---|---|---|---|---|
| Dynamic durability 3) | | | | | | | | |
| Hardness loss (%) | 14.4 | 14.9 | 15.3 | 15.3 | 17.3 | 16.3 | 18.4 | 20.1 |
| Height loss (%) | 1.3 | 1.2 | 1.2 | 1.4 | 1.9 | 1.5 | 1.9 | 2.5 |

1) Proportion of polyol prepared in the presence of a catalyst having nitrogen-phosphorus double bond in the whole polyol.
2) In accordance with JIS-K-6400
3) By dynamic durability test in the example

COMPARATIVE EXAMPLES 1 TO 4

The same procedures as Example 1 were carried out except that polyoxyalkylene polyol A was replaced by polyoxyalkylene polyols F to I and polymer polyol a was replaced by polymer polyols c. The equivalent ratio (NCO/H) of isocyanate to active hydrogen of resin premix was 1.00.

Properties of flexible foams obtained are shown in Table 4.

TABLE 4

| Comparative example | 1 | 2 | 3 | 4 |
|---|---|---|---|---|
| Polyol | F | G | H | I |
| Polymer polyol | c | c | c | c |
| Polyol proportion (wt %) 1) | 0 | 0 | 0 | 0 |
| Overall density (kg/m³) 2) | 55.2 | 54.7 | 55.0 | 54.6 |
| Hardness, 25% ILD (kgf/314 cm²) 2) | 16.5 | 18.6 | 17.1 | 16.8 |
| Wet compression set (%) 2) | 16.2 | 14.1 | 15.9 | 12.2 |
| Fatigue by constant-load-pounding 2) | | | | |
| Hardness loss (%) | 14.9 | 16.4 | 15.2 | 12.3 |
| Height loss (%) | 1.7 | 2.0 | 1.8 | 1.5 |
| Dynamic durability 3) | | | | |
| Hardness loss (%) | 22.2 | 23.0 | 22.8 | 20.4 |
| Height loss (%) | 2.9 | 3.5 | 3.4 | 3.1 |

1) Proportion of polyol prepared in the presence of a catalyst having nitrogen-phosphorus double bond in the whole polyol.
2) In accordance with JIS-K-6400
3) By dynamic durability test in the example Physical properties were evaluated in accordance with JIS. Hardness, fatigue by constant-load pounding and wet compression set of flexible foam were measured in accordance with JIS-K-6400.

Repeated compression test was carried out by using a flexible foam block which was cut out from the core portion of flexible foam into dimensions of 100×100×50 mm.

The cut-out flexible foam was inserted between parallel plates and repeatedly compressed to a 50% thickness continuously up to 80,000 cycles at a velocity of 60 cycles per minute at the room temperature. Thereafter, the specimen was taken out, allowed to stand for 30 minutes, and measured thickness and hardness (25% CLD).

The rate of permanent set and hardness loss were calculated by comparing with the values before test.

Dynamic durability was evaluated as follows.

A flexible foam block having dimensions of 400×400×100 mm was conditioned in a thermostat at 23±3° C. for 24 hours under 50% RH.

The specimen was tested in accordance with JASO-B-407-82. After giving 180,000 cycles of vibration to the foam under load of 50 kgf, frequency of 3 Hz and maximum acceleration of 0.7 G, the foam specimen was allowed to stand for 30 minutes, and thickness and hardness (25% ILD) were measured. The rate of permanent set and hardness loss were calculated by comparing with the values before the test. Results are illustrated in Table 3 and Table 4.

Foams prepared in Examples 1 to 8 have good wet compression set, fatigue by constant-load pounding and dynamic durability. On the other hand, foams prepared in Comparative Examples 1 to 4 were prepared from the polyol outside the scope of the invention and had inferior foam properties. The foam obtained in Comparative Example 4 by using a composite metal cyanide complex catalyst had an extremely high closed cell content and foam cells were coarse.

Polyols in Examples 1 to 4 having a low hydroxyl value provide better wet compression set, fatigue by constant-load pounding and dynamic durability as compared with polyol in Example 5 having a high hydroxyl value.

Following raw materials were used as isocyanate.

Isocyanate-2

Cosmonate TDI-80: manufactured by Mitsui Chemicals Inc.

A 80:20 by weight mixture of 2,4-tolylene diisocyanate and 2,6-tolylene diisocyanate.

Isocyanate-3

A 30:70 by weight mixture of TDI-80 and polymeric MDI

EXAMPLES 9, 10, 11

The same procedures as Example 1 were carried out except that polyoxyalkylene polyol A was replaced by polyoxyalkylene polyol B and isocyanate-1 was replaced by isocyanate-2 and -3. The equivalent ratio of isocyanate to active hydrogen of resin premix (NCO/H) was 1.00.

Properties of flexible foam obtained are shown in Table 5.

Foams of Examples 9 and 10 obtained by using 0 part and 20 parts of polymethylenepolyphenyl polyisocyanate, respectively, have better mechanical properties such as elongation and tear resistant strength as compared with the foam obtained in Example 11 by using 70 parts of polymethylenepolyphenyl polyisocyanate in the polyisocyanate ingredient.

Thus foams of Examples 9 and 10 have better balance of properties.

TABLE 5

| Example | 9 | 10 | 11 |
|---|---|---|---|
| Polyol | B | B | B |
| Polymer Polyol | a | a | a |
| Isocyanate, | 1 | 2 | 3 |
| Overall density (kg/m³) 1) | 55.1 | 54.7 | 55.1 |
| Hardness 25% ILD 1) (kgf/314 cm²) | 18.0 | 20.1 | 21.3 |
| Wet compression set 1) (%) | 7.5 | 9.6 | 8.1 |
| Mechanical strength 1) | | | |
| Elongation (%) | 108 | 121 | 83 |
| Tear resistant strength (kg/cm) | 0.56 | 0.64 | 0.37 |

1) In accordance with JIS-K-6400

The following materials were used as isocyanate.

Isocyanate-4

To 85 parts of polymethylenepolyphenyl polyisocyanate which contains 67.5% of two ring fraction, 24.0% of three ring fraction and 8.5% of four or more ring fraction, 15 parts of 2,4-tolylene diisocyanate was added and stirred for 1 hour. Successively, 14.5 parts of random addition polyoxyalkylene polyol having an average molecular weight of 8,000, average functionality of 3, and ethylene oxide/propylene oxide mol addition polymerization ratio of 35/65 was added and reacted with stirring at 80° C. for 2 hours to obtain isocyanate-4 having NCO content of 30.1%.

Isocyanate-5

A 25:45:30 weight ratio mixture composed of tolylene diisocyanate; TDI-80 (manufactured by Mitsui Chemicals Inc.) and 4,4-diphenylmethane diisocyanate and polymethylenepolyphenyl polyisocyanate; Cosmonate M-200 (manufactured by Mitsui Chemicals Inc.).

Isocyanate-6

To 75 parts of polymethylenepolyphenyl polyisocyanate containing 89.0% of two ring fraction, 4.5% of three ring fraction and 6.5% of four or more ring fraction, 25 parts of polyoxyalkylene polyol having an average molecular weight of 5,000 and average functionality of 3 was added and reacted with stirring at 80° C. for 2 hours to obtain isocyanate-6 having an NCO content of 25.0%.

Following raw materials were used in addition to polyoxyalkylene polyol, polymer polyol, isocyanate, catalyst and surfactant which were used in Examples 1 to 8 and Comparative Examples 1 to 4.

Crosslinking agent 2

Diethanolamine: manufactured by Mitsui Chemicals Inc. Hydroxyl value 1.600 mg KOH/g.

Crosslinking agent 3

Glycerol: Hydroxyl value 1.680 mg KOH/g.

Surfactant 2

SZ-1306: manufactured by Nippon Unicar Co.
Silicone surfactant

Surfactant 3

SF-2969: manufactured by Toray•Dow Corning•Silicone Co.
Silicone surfactant

Example 12
A resin premix was prepared by mixing 6 ingredients below.

| Polyoxyalkylene polyol | 70 parts |
| Polymer polyol | 30 parts |
| Water | 3.0 parts |
| Catalyst-1 | 0.4 parts |
| Catalyst-2 | 0.1 parts |
| Surfactant-2 | 0.7 parts |

Polyoxyalkylene polyol B and polymer polyol b were used. To 104.2 parts of the above resin premix, 52 parts of isocyanate 4 was mixed and immediately poured into a metal mold which had internal dimensions of 400×400×100 mm and was previously controlled to 60° C. The lid of the mold was closed and the foam was allowed to expand. Curing was carried out at 100° C. for 7 minutes in a hot air oven. Thereafter the flexible foam was taken out of the mold. Properties of the flexible foam obtained are shown in Table 6. In the example, NCO/H ratio was 1.00.

COMPARATIVE EXAMPLE 5

The same procedures as Example 12 were carried out except that polyoxyalkylene polyol B was replaced by polyoxyalkylene polyol F and polymer polyol b was replaced by polymer polyol c. Properties of flexible foam obtained are shown in Table 6.

Example 13
A resin premix was prepared by mixing the 7 ingredients below.

| Polyoxyalkylene polyol | 60 parts |
| Polymer polyol | 40 parts |
| Crosslinking agent-2 | 1.0 parts |
| Water | 3.0 parts |
| Catalyst-1 | 0.5 parts |
| Catalyst-2 | 0.1 parts |
| Surfactant-1 | 1.0 parts |

Polyoxyalkylene polyol B and polymer polyol b were used. To 105.6 parts of the above resin premix, 47 parts of isocyanate 5 was added, mixed and immediately poured into a metal mold which had internal dimensions of 400×400×100 mm and was previously controlled to 60° C. The mold lid was closed and allowed to stand for foam expansion. Successively, curing of the foam was carried out in the mold as such by putting the mold in a hot air oven at 100° C. for 7 minutes. Thereafter, a cured flexible foam was taken out of the mold. Properties of the flexible foam thus obtained are shown in Table 6.

In this example, the NCO/H ratio was 1.00.

COMPARATIVE EXAMPLE 6

The same procedures as Example 13 were carried out except that polyoxyalkylene polyol B was replaced by polyoxyalkylene polyol F and polymer polyol b was replaced by polymer polyol c. Properties of flexible foam obtained are shown in Table 6.

Example 14
A resin premix was prepared by the following formulation.

| Polyoxyalkylene polyol | 90 parts |
| Polymer polyol | 10 parts |
| Crosslinking agent-3 | 1.3 parts |
| Water | 3.8 parts |
| Catalyst-1 | 0.5 parts |
| Catalyst-2 | 0.1 parts |
| Surfactant-3 | 1.0 parts |

Polyoxyalkylene polyol B and polymer polyol b were used. To 106.7 parts of the above resin premix, 47 parts of isocyanate 6 was added, vigorously mixed and immediately poured into a metal mold which had internal dimensions of 400×400×100 mm and was previously warmed to 60° C. The mold lid was closed and allowed to stand for foam expansion. Successively, curing of the foam was carried out in the mold by placing the mold in a hot air oven at 100° C. for 7 minutes. Thereafter, a cured flexible foam was taken out of the mold.

Properties of the flexible foam thus obtained are shown in Table 6.

In this example, the NCO/H ratio was 0.80.

COMPARATIVE EXAMPLE 7

The same procedures as Example 14 were carried out except that polyoxyalkylene polyol B was replaced by polyoxyalkylene polyol F and polymer polyol b was replaced by polymer polyol c. Properties of flexible foam obtained are shown in Table 6.

TABLE 6

| | Ex 12 | Com. Ex 5 | Ex 13 | Com. Ex 6 | Ex 14 | Com. EX 7 |
|---|---|---|---|---|---|---|
| Polyol | B | F | B | F | B | F |
| Polymer polyol | b | c | b | c | b | c |
| Polyol proportion (wt %) 1) | 100 | 0 | 100 | 0 | 100 | 0 |
| Isocyanate | 4 | 4 | 5 | 5 | 6 | 6 |
| Overall density (kg/m$^3$) 2) | 55.2 | 55.1 | 55.1 | 54.7 | 63.2 | 62.9 |
| Hardness, 25% ILD (kgf/314 cm$^2$) | 16.2 | 17.1 | 18.7 | 18.4 | 17.4 | 18.3 |
| Wet compression set (%) 2) | 9.4 | 16.2 | 8.4 | 17.7 | 10.1 | 18.2 |
| Fatigue by constant-load pounding 2) | | | | | | |
| Hardness loss (%) | 9.8 | 16.2 | 8.2 | 15.9 | 10.4 | 18.2 |
| Height loss (%) | 1.2 | 2.6 | 1.3 | 2.2 | 1.9 | 2.6 |
| Dynamic durability 3) | | | | | | |
| Hardness loss (%) | 17.4 | 25.1 | 18.1 | 24.7 | 19.3 | 25.8 |
| Height loss (%) | 1.8 | 2.9 | 1.9 | 2.8 | 2.3 | 3.2 |

1) Proportion of polyol prepared in the presence of a catalyst having nitrogen-phosphorus double bond in the whole polyol.
2) In accordance with JIS-K-6400
3) By dynamic durability test in the example
Ex: Example
Co. Ex: Comparative example Foams obtained in Examples 12, 13 and 14 are excellent in wet compression set, fatigue by constant-load pounding and dynamic durability.

On the other hand, in Comparative Examples 5, 6 and 7, polyol used are outside the scope of the invention and resulting foams have inferior properties.

EXAMPLES 15 TO 20

Polyols were prepared by the same procedure as synthesis example 1, phosphazenium compounds were as follows.

Properties of the obtained polyol were as shown in Table 7.

TABLE 7

| Polyol | M | N | O | P |
|---|---|---|---|---|
| Number of hydroxyl groups | 3 | 3 | 3 | 3 |
| Catalyst | m | n | o | p |
| Hydroxyl value (mgKOH/g) | 24 | 24 | 24 | 24 |
| Terminal oxyethylene group content (wt %) | 15 | 15 | 15 | 15 |
| Monool content (mol %) | 7.6 | 7.9 | 7.8 | 7.8 |
| Head-to-Tail selectivity (mol %) | 97.3 | 97.4 | 97.7 | 96.9 |

Catalyst for synthesis of polyol
m: tetrakis[tris(dimethylamino)phosphoranilideamino phosphonium-methoxide
n: tetrakis[tris(dimethylamino)phosphoranilideamino phosphonium-ethoxide
o: tetrakis[tri(pyrollidine-1-il))phosphoranilideamino phosphonium-methoxide
p: dimethylaminotris[tris(dimethylamino) phosphoranilideamino phosphonium-hydroxide Resin premixes were prepared by the same formulation as Example 1 and by using the obtained polyols, respectively.

To 106.7 parts of the above resin premix, 39 parts of isocyanate 1 was added, vigorously mixed and immediately poured into the same metal mold as example 1 and was foamed and cured to obtain flexible foam, respectively. Properties of these flexible foams thus obtained are shown in Table 8.

TABLE 8

| Example | 15 | 16 | 17 | 18 | 19 | 20 |
|---|---|---|---|---|---|---|
| Polyol | M | M | N | N | O | P |
| Polymer polyol | a | b | a | b | a | a |
| Polyol proportion (wt %) 1) | 100 | 100 | 100 | 100 | 100 | 100 |
| Overall density (kg/m$^3$) 2) | 55.1 | 54.9 | 55.3 | 55.3 | 55.1 | 55.2 |
| Hardness, 25% ILD (kgf/314 cm$^2$) 2) | 18.2 | 18.3 | 17.9 | 18.5 | 18.6 | 18.3 |
| Wet compression set (%) 2) | 7.2 | 8.5 | 7.6 | 8.7 | 7.4 | 7.5 |
| Fatigue by constant-load pounding 2) | | | | | | |
| Hardness loss (%) | 6.3 | 8.1 | 6.7 | 8.0 | 7.1 | 6.8 |
| Height loss (%) | 0.6 | 0.7 | 0.7 | 0.8 | 0.7 | 0.6 |
| Dynamic durability 3) | | | | | | |
| Hardness loss (%) | 14.8 | 17.3 | 14.6 | 17.0 | 14.1 | 14.2 |
| Height loss (%) | 1.4 | 1.6 | 1.3 | 1.4 | 1.3 | 1.2 |

1) Proportion of polyol prepared in the presence of a catalyst having nitrogen-phosphorus double bond in the whole polyol.
2) In accordance with JIS-K-6400
3) By dynamic durability test in the example

What is claimed is:
1. A flexible polyurethane foam prepared from a polyol ingredient which is a polyol and/or polymer polyol having dispersed polymer microparticles obtained by polymerizing an unsaturated compound in the polyol; water, catalyst, surfactant, and polyisocyanate, wherein the polyol ingredient is prepared in the presence of a compound having a nitrogen-phosphorus double bond as a catalyst wherein the compound having a nitrogen-phosphorus double bond is a phosphazenium compound represented by the formula (1) or the formula (2):

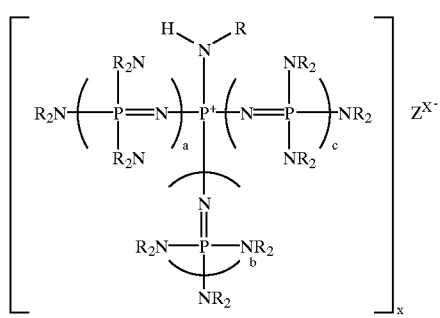

wherein a, b and c are individually a positive integer of 3 or less or 0 and are not all 0 at the same time, R's are the same or different hydrocarbons having 1 to 10 carbon atoms, and two R's located on each common nitrogen atom may be coupled together to form a ring structure, X indicates the number of phosphazenium cations, $Z^{x-}$ is an anion of a X-valent active hydrogen compound,

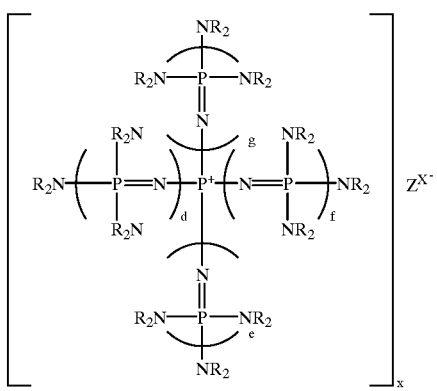

(2)

wherein d, e, f and g are individually a positive integer of 3 or less or 0 and are not all 0 at the same time, R's are the same or different hydrocarbons having 1 to 10 carbon atoms, and two R's located on each common nitrogen atom may be coupled together to form a ring structure, X indicates the number of phosphazenium cations, $Z^{x-}$ is an anion of a X-valent active hydrogen compound.

2. A flexible polyurethane foam according to claim 1 wherein the polymer polyol is prepared by radical polymerization of an unsaturated compound in the polyol and the resulting polymer microparticles are dispersed in the polyol.

3. A flexible polyurethane foam according to claim 2 wherein the polyol has a monool content of 15 mol % or less and a head-to-tail bonding selectivity of 96% or more.

4. A flexible polyurethane foam comprising additionally using an active hydrogen compound having a hydroxyl value of 200 to 2000 mg KOH/g as a crosslinking agent for a flexible polyurethane foam according claim 3.

5. A flexible polyurethane foam according to claim 4 wherein 20 wt % or more in the polyol ingredient is prepared in the presence of said phosphazenium compound.

6. A flexible polyurethane foam according to claim 4 wherein 40 wt % or more in the polyol ingredient is prepared in the presence of said phosphazenium compound.

7. A flexible polyurethane foam according to claim 6 wherein the polyol is prepared by polymerization of alkylene oxide on an active hydrogen compound having a functionality of 2 to 6 in the presence of said phosphazenium compound, has a hydroxyl value of 10 to 40 mg KOH/g, and has an ethylene oxide proportion 5 to 30 wt % in alkylene oxide.

8. A flexible polyurethane foam according to claim 6 wherein the polyol is prepared by polymerization of alkylene oxide on an active hydrogen compound having a functionality of 3 to 4 in the presence of said phosphazenium compound, has a hydroxyl value of 15 to 35 mg KOH/g, and has an ethylene oxide proportion of 10 to 20 wt % in alkylene oxide.

9. A flexible polyurethane foam according claim 8 wherein the polymer microparticles obtained by polymerization of an unsaturated compound have a proportion of 2 to 50 wt % in the polymer polyol.

10. A flexible polyurethane foam according claim 8 wherein the polymer microparticles obtained by polymerization of an unsaturated compound have a proportion of 10 to 40 wt % in the polymer dispersed polyol.

11. A flexible polyurethane foam having 11.5% or less of wet compression set, and 20% or less of hardness loss and 2.5% or less of height loss in dynamic durability.

12. A flexible polyurethane foam according to claim 11 wherein the polymer polyol is prepared by radical polymerization of unsaturated compound in the polyol and the resulting polymer microparticles are dispersed in the polyol.

13. A flexible polyurethane foam according to claim 1 wherein the polyol has a monool content of 15 mol % or less and a head-to-tail bonding selectivity of 96% or more.

14. A flexible polyurethane foam comprising additionally using an active hydrogen compound having a hydroxyl value of 200 to 2000 mg KOH/g as a crosslinking agent for a flexible polyurethane foam according to claim 1.

15. A flexible polyurethane foam according to claim 1 wherein 20 wt % or more in the polyol ingredient is prepared in the presence of said phosphazenium compound.

16. A flexible polyurethane foam according to claim 1 wherein 40 wt % or more in the polyol ingredient is prepared in the presence of said phosphazenium compound.

17. A flexible polyurethane foam according to claim 1 wherein the polyol is prepared by polymerization of alkylene oxide on an active hydrogen compound having a functionality of 2 to 6 in the presence of said phosphazenium compound, has a hydroxyl value of 10 to 40 mg KOH/g, and has an ethylene oxide proportion 5 to 30 wt % in alkylene oxide.

18. A flexible polyurethane foam according to claim 1 wherein the polyol is prepared by polymerization of alkylene oxide on an active hydrogen compound having a functionality of 3 to 4 in the presence of said phosphazenium compound, has a hydroxyl value of 15 to 35 mg KOH/g, and has an ethylene oxide proportion of 10 to 20 wt % in alkylene oxide.

19. A flexible polyurethane foam according to claim 1 wherein the polymer microparticles obtained by polymerization of an unsaturated compound having a proportion of 2 to 50 wt % in the polymer polyol.

20. A flexible polyurethane foam according to claim 1 wherein the polymer microparticles obtained by polymerization of an unsaturated compound have a proportion of 10 to 40 wt % in the polymer dispersed polyol.

21. A flexible polyurethane foam according to claim 1 wherein polyisocyanate is tolylene diisocyanate.

22. A flexible polyurethane foam according to claim 1 wherein polyisocyanate is a 98:2 to 50:50 weight ratio mixture of tolylene diisocyanate and polymethylenepolyphenyl polyisocyanate represented by the formula (3):

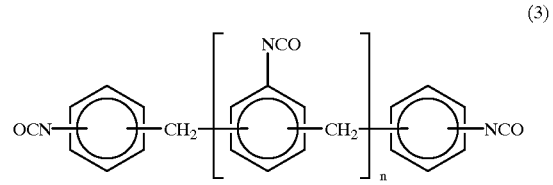

(3)

wherein n is 0 or an integer of 1 or more.

23. A flexible polyurethane foam according to claim 1 wherein polyisocyanate is a mixture or a urethane modified derivative of the mixture comprised of 30 to 95 wt % of diphenylmethane diisocyanate having an isomer ratio of 1:99 to 50:50 in 2,4'-diphenylmethane diisocyanate to 4,4'-diphenylmethane diisocyanate and 70 to 5 wt % of polymethylenepolyphenyl polyisocyanate having 1 or more n in the formula (3):

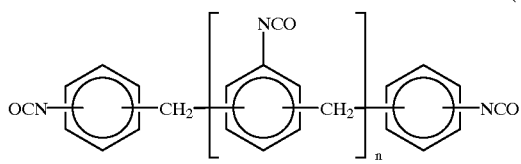
(3)

wherein n is 0 or an integer of 1 or more.

24. A flexible polyurethane foam according to claim 23 wherein the polyisocyanate is a mixture of polyisocyanate according to claim 23 and tolylene diisocyanate, and tolylene diisocyanate occupies 1 to 70 wt % of said mixture.

25. A flexible polyurethane foam according to claim 11 wherein the flexible polyurethane foam is prepared from a polyol ingredient which is a polyol and/or polymer polyol having dispersed polymer microparticles obtained by polymerizing an unsaturated compound in the polyol; water, catalyst, surfactant, and polyisocyanate, and the polyol ingredient is prepared in the presence of a compound having a nitrogen-phosphorus double bond as a catalyst wherein the compound having a nitrogen-phosphorus double bond is a phosphazenium compound represented by the formula (1) or the formula (2):

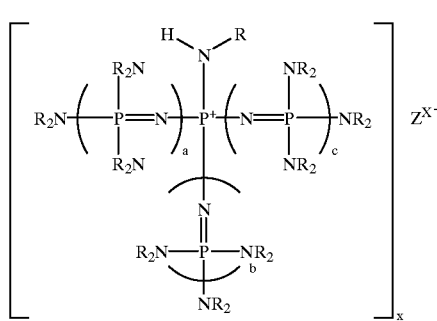
(1)

wherein a, b and c are individually a positive integer of 3 or less or 0 and are not all 0 at the same time, R's are the same or different hydrocarbons having 1 to 10 carbon atoms, and two R's located on each common nitrogen atom may be coupled together to form a ring structure, X indicates the number of phosphazenium cations, $Z^{x-}$ is an anion of a X-valent active hydrogen compound,

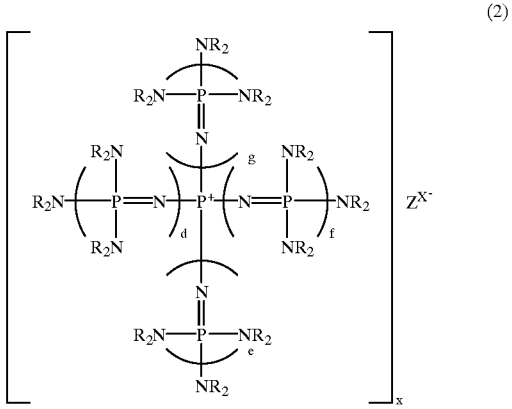
(2)

wherein d, e, f and g are individually a positive integer of 3 or less or 1 and are not all 0 at the same time, R's are the same or different hydrocarbons having 1 to 10 carbon atoms, and two R's located on each common nitrogen atom may be coupled together to form a ring structure, X indicates the number of phosphazenium cations, $Z^{x-}$ is an anion of a X-valent active hydrogen compound.

* * * * *